(12) United States Patent
Powell

(10) Patent No.: US 7,425,226 B2
(45) Date of Patent: Sep. 16, 2008

(54) FLUID FILTER WITH CANTED FANFOLD PLEATS

(76) Inventor: Allan R. Powell, 2104 Amicks Ferry Rd., Chapin, SC (US) 29036

(*) Notice: Subject to any disclaimer, the term of this patent is extended or adjusted under 35 U.S.C. 154(b) by 260 days.

(21) Appl. No.: 11/414,797

(22) Filed: May 1, 2006

(65) Prior Publication Data

US 2006/0254230 A1 Nov. 16, 2006

Related U.S. Application Data

(60) Provisional application No. 60/680,342, filed on May 12, 2005.

(51) Int. Cl.
*B01D 46/00* (2006.01)
(52) U.S. Cl. .............. 55/497; 55/484; 55/521; 210/493.5
(58) Field of Classification Search ............. 55/483, 55/484, 497, 499, 500, 521; 210/455, 493.1, 210/493.2, 493.3, 493.5
See application file for complete search history.

(56) References Cited

U.S. PATENT DOCUMENTS

| 2,206,684 | A | * | 7/1940 | Yant ....................... 55/500 |
| 3,490,211 | A | | 1/1970 | Cartier |
| 4,081,255 | A | | 3/1978 | Evans |
| 4,171,963 | A | | 10/1979 | Shuler |
| 4,942,019 | A | | 7/1990 | Goodell et al. |
| 5,066,400 | A | * | 11/1991 | Rocklitz et al. ........... 210/493.5 |
| 5,174,896 | A | | 12/1992 | Harms, II |
| 5,236,480 | A | * | 8/1993 | Svensson et al. ............ 55/385.2 |
| 5,316,677 | A | | 5/1994 | Harms, II |
| 5,543,047 | A | * | 8/1996 | Stoyell et al. ............. 210/493.2 |
| 5,690,765 | A | * | 11/1997 | Stoyell et al. .................. 156/69 |
| 5,744,036 | A | * | 4/1998 | Choi ........................ 210/493.5 |
| 5,779,747 | A | * | 7/1998 | Schlor et al. ................... 55/497 |
| 5,792,228 | A | * | 8/1998 | Fath et al. ...................... 55/497 |
| 5,876,601 | A | * | 3/1999 | Geibel et al. ............. 210/493.1 |
| 6,036,752 | A | * | 3/2000 | Reuter ............................ 96/67 |
| 6,113,784 | A | * | 9/2000 | Stoyell et al. ............. 210/493.2 |
| 6,165,241 | A | * | 12/2000 | Choi ............................ 55/521 |
| 6,203,592 | B1 | * | 3/2001 | Carawan ....................... 55/484 |
| 6,279,570 | B1 | | 8/2001 | Mittelstadt et al. |
| 6,447,566 | B1 | * | 9/2002 | Rivera et al. ................... 55/482 |
| 6,485,538 | B1 | * | 11/2002 | Toyoshima .................. 55/490 |
| 7,048,501 | B2 | * | 5/2006 | Katayama et al. ......... 415/121.2 |
| 7,156,898 | B2 | * | 1/2007 | Jaisinghani ..................... 95/63 |
| 2004/0074387 | A1 | | 4/2004 | Jaisinghani |
| 2006/0108277 | A1 | * | 5/2006 | Fall et al. ..................... 210/338 |

* cited by examiner

*Primary Examiner*—Duane Smith
*Assistant Examiner*—Robert A Clemente
(74) *Attorney, Agent, or Firm*—Michael A. Mann; Townsend M. Belser, Jr.; Nexsen Pruet, LLC

(57) ABSTRACT

Fanfold filter element has filtering media pleats canted at a predetermined angle relative to a reference plane such that the depth of each pleat is greater than the depth of a mounting frame to increase effective filtering area. The frame is canted by a corresponding amount so that central planes of pleat pockets are aligned with the direction of incoming fluid flow.

22 Claims, 6 Drawing Sheets

FLUID FILTER WITH CANTED FANFOLD PLEATS

CROSS REFERENCE TO RELATED PATENTS

The priority benefit of U.S. provisional patent application No. 60/680,342, filed May 12, 2005, is hereby claimed, and the entire contents thereof are expressly incorporated herein by reference.

TECHNICAL FIELD OF THE INVENTION

This invention relates to fluid filters. It is more particularly concerned with increasing filter airflow and/or increasing the surface area of filtering media within the constraints of the installation space for housing a filter.

BACKGROUND OF THE INVENTION

Referring to the prior art shown in FIG. 1, air filters are traditionally produced with a filter element 10 in which the pleats 12 of a filtering media 13 are folded to form pockets having sidewalls that are equidistant from a central plane, such as plane CP, that is ideally perpendicular relative to an imaginary reference plane P, which is tangent to an imaginary line L extending along the exterior surface of each of the folds on one side of the pleated element 10. In other words, if the plane P is considered as being horizontal for ease of explanation only, the angle V1 between planes CP and P is about 90°, i.e., within plus or minus 5 degrees of vertical. When each pocket has parallel sidewalls as shown in FIG. 1, the angle V2 between each sidewall and reference plane P is substantially equal to angle V1.

The pleats 12 are bonded together in spaced relation and separated from each other by a suitable bonding medium, such as adhesive beads 14. The element 10 may have a rectangular shape consisting of many more pleats than the few shown in FIG. 1 by way of example. Element 10 is then sealed into a rectangular frame of the same shape with corresponding vertical sides so as to present the openings of the pleats to the incoming airflow.

The "flow resistance", which reduces the air pressure and flow rate downstream of the filter, will increase if the angle V1 deviates from the vertical because this will cause the incoming air to "bend" in order to flow into the pockets and pass through the filter media, and thereby through the filter structure. The surface area of the filter media has a direct bearing on the CFM (cubic feet per minute) rate at which air will permeate through the filtering media while still maintaining the filtering characteristics of this media.

SUMMARY OF THE INVENTION

According to the present invention, the pleated elements of a filtering media are produced with their pleats canted (slanted) at a predetermined angle from the perpendicular relative to a reference plane P'. By forming the pleats at such an angle, the depth of each pleat is greater than the depth of the mounting frame, thereby realizing an increase in the effective filtering area relative to the overall dimensions of a traditional installation space for receiving the filter structure. To avoid any increase in the flow resistance due to the increase in the effective filtering area, which might otherwise decrease the volumetric rate of airflow, the entire filter structure is canted by a corresponding amount when mounted for use so that the direction of the incoming airflow is aligned with the central axes or planes of the pockets formed between the sidewalls of adjacent pleats.

The following are some of the advantages of the canted fanfold filter structure and its mounting arrangement as described herein:

(1) There may be a gain of about 40% to about 50% in the surface area of the filtering media, as compared to a traditional fanfold filter of the same depth, i.e., the dimension in the direction of fluid flow.

(2) There is a significant reduction in the pressure drop across the filtering media, as compared to non-parallel presentation of traditional pleats with an angle V1 of 90°.

(3) There is a gain in the volumetric flow rate of air through the filtering media, as compared to non-parallel presentation of traditional pleats with an angle V1 of 90°.

(4) A filtering unit with one or more canted filter members of the invention can be fitted with a dedicated self-contained blower to reduce dependence on blowers of traditional air conditioning and/or heating systems.

(5) All contaminated air returned by a traditional air conditioning and/or heating system may be passed through a HEPA filter made according to the invention, instead of having a significant portion of returning air bypass the high efficiency filter as with traditional arrangements employing traditional filters.

BRIEF DESCRIPTION OF THE DRAWING

The invention and its structure, assembly and operation may be further understood from the following detailed description of the preferred practices thereof taken in conjunction with the accompanying drawings, in which.

DETAILED DESCRIPTION OF THE INVENTION

Figure 1:
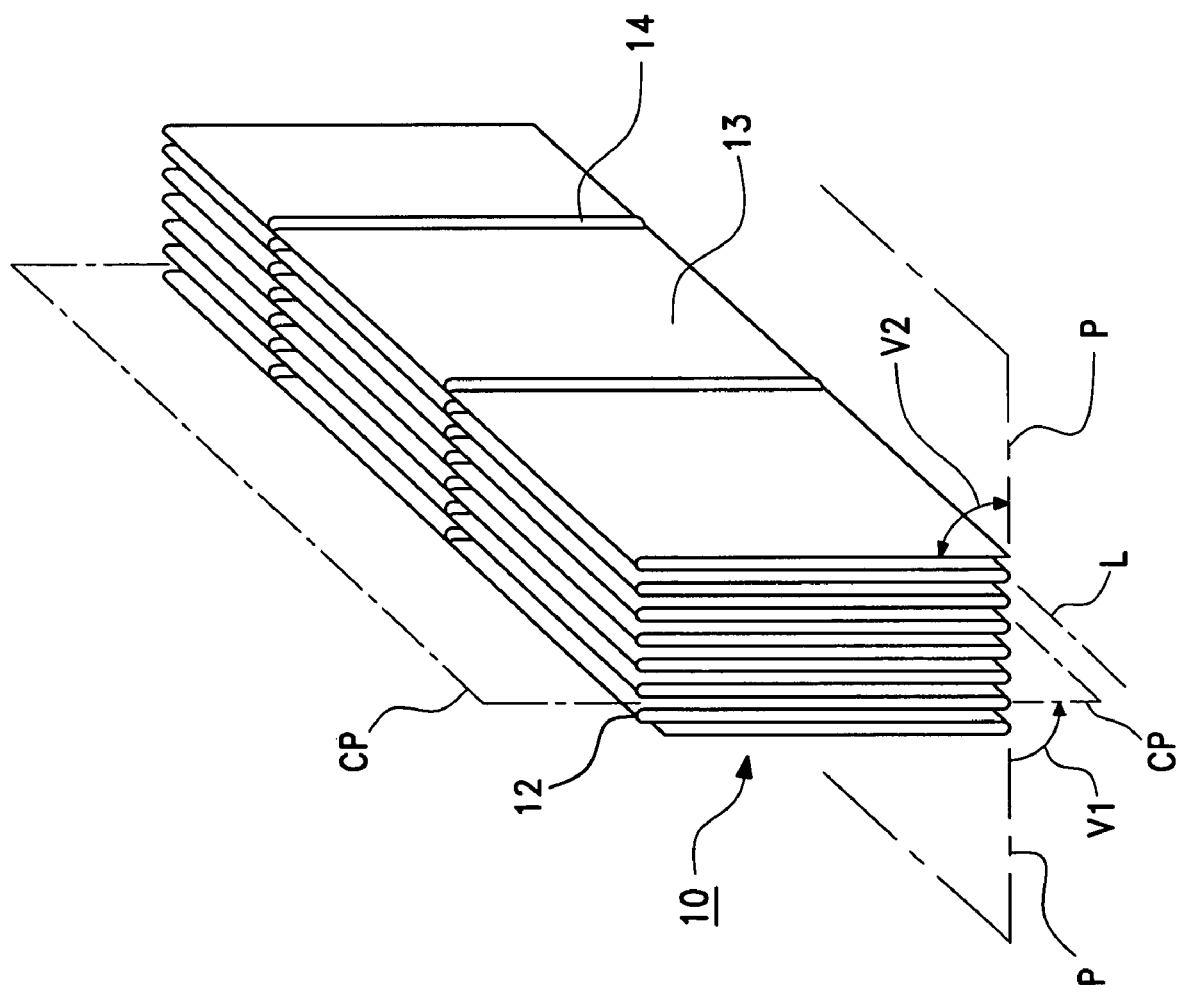
FIG. 1 is a view in perspective of a segment of a pleated filter element of the prior art.
Figure 2:
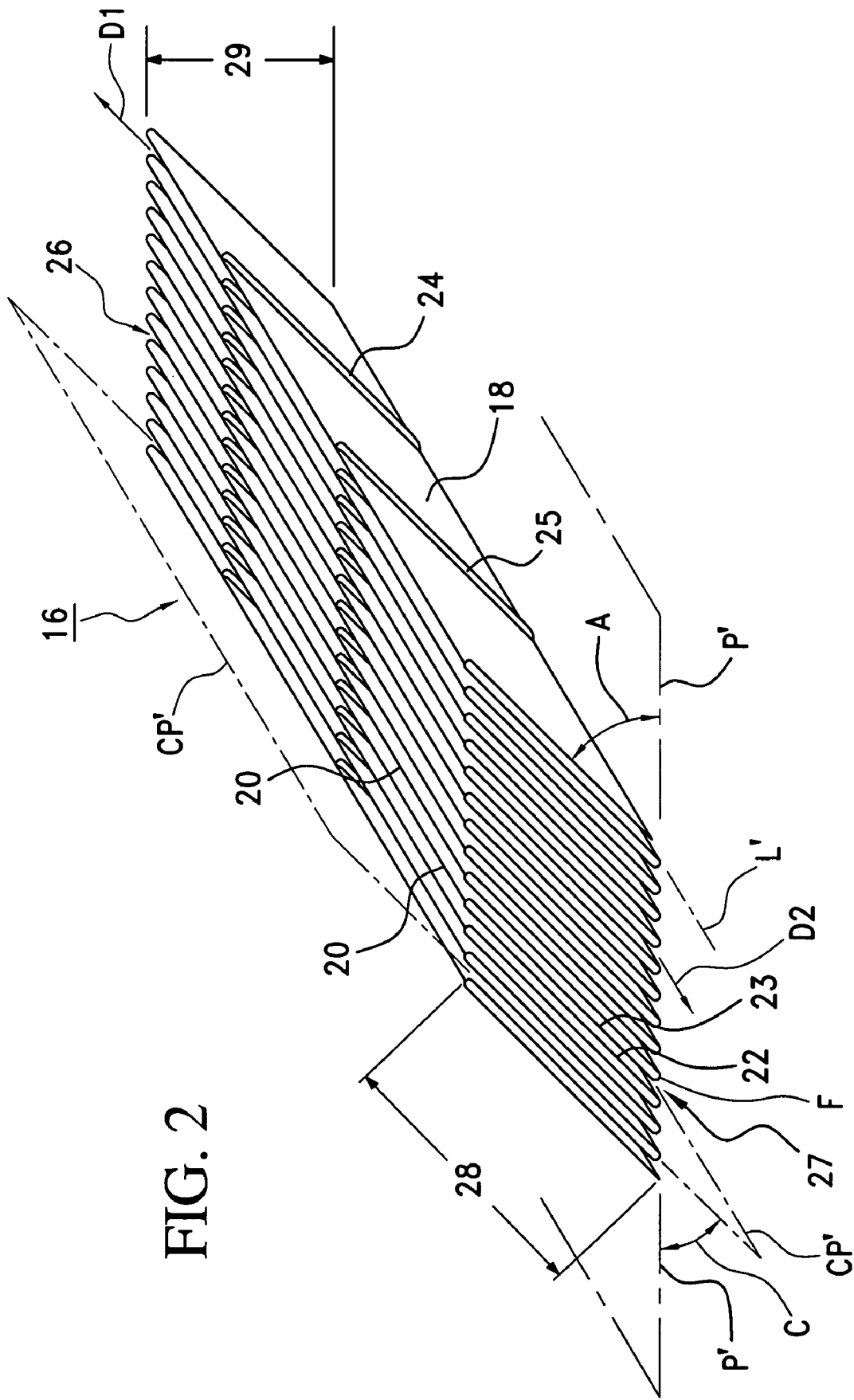
FIG. 2 is a view in perspective of a segment of a filter element with canted pleats according to the present invention.

A preferred embodiment of this invention will now be described by way of an example only, with reference to FIGS. 2-6. Referring first to FIG. 2, there is shown a segment of a canted pleated element 16 for use in a high CFM filter member. The filtering media 18 may comprise a bonded mat of non-woven glass fibers formed into a high-density paper-like substrate.

Each pleat 20 of fanfolded filtering media 18 comprises two opposite sidewalls 22 and 23 of different heights that are on opposite sides of a fold F joining their bases to form a pocket of the pleat, the sidewall 23 being shorter than sidewall 22. These sidewalls are repeated in alternating fashion for each subsequent pleat in either direction of the fanfold, wherein adjacent pleats 20,20 with opposing sidewalls 23-22 have pocket openings all facing in a first direction D1 and each individual pleat 20 with opposite sidewalls 22-23 have pocket openings all facing in a second direction D2 that is opposite to D1. The difference in the height of opposite sidewalls 22 and 23 is dependant upon the desired angle C between a central plane CP' of the pleat pocket and an imaginary reference plane P', which is tangent to an imaginary line L' extending along the exterior surface of each of the folds F on one side of the pleated element 16.

Figure 3:
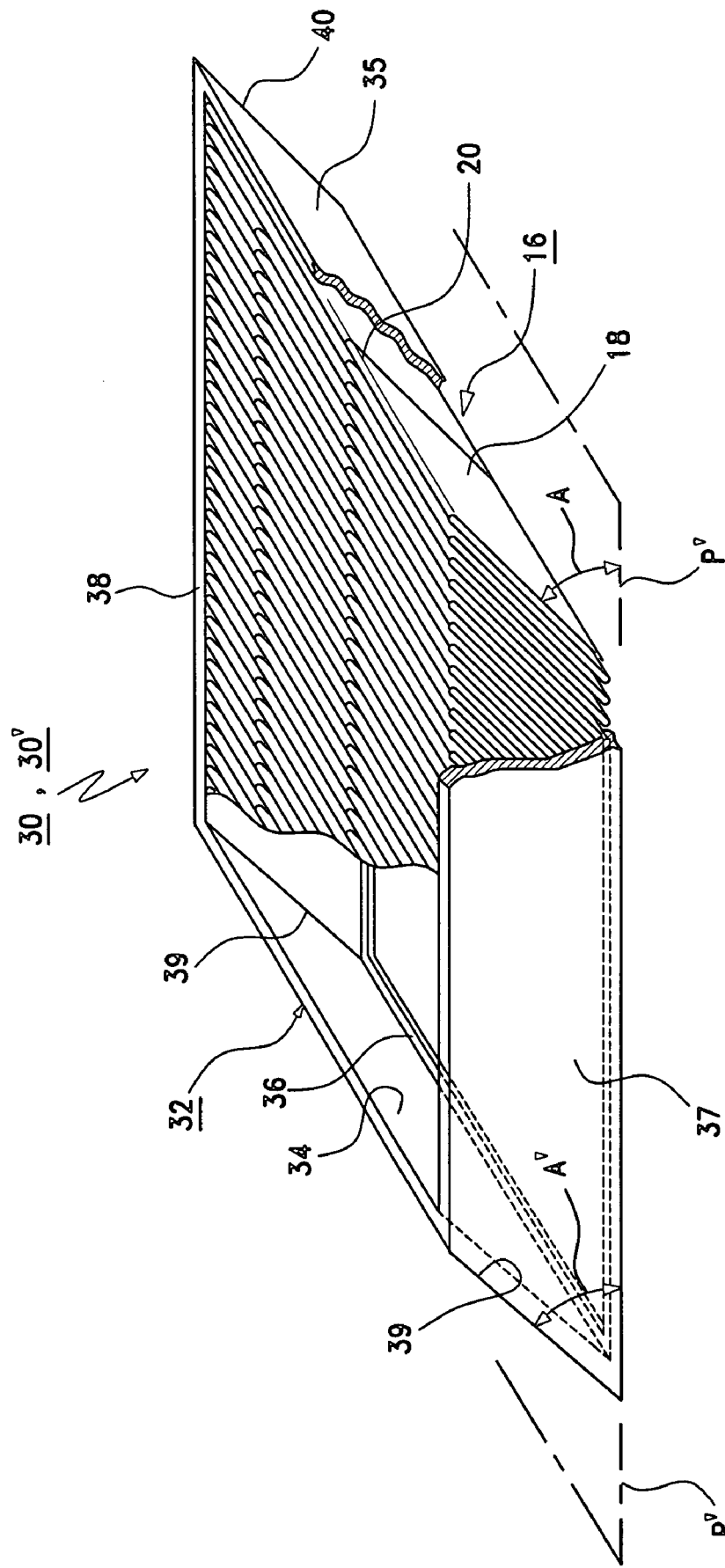
FIG. 3 is a partially cut away view in perspective of a filter member containing a filter element with the canted pleats of FIG. 2.
Figure 4:
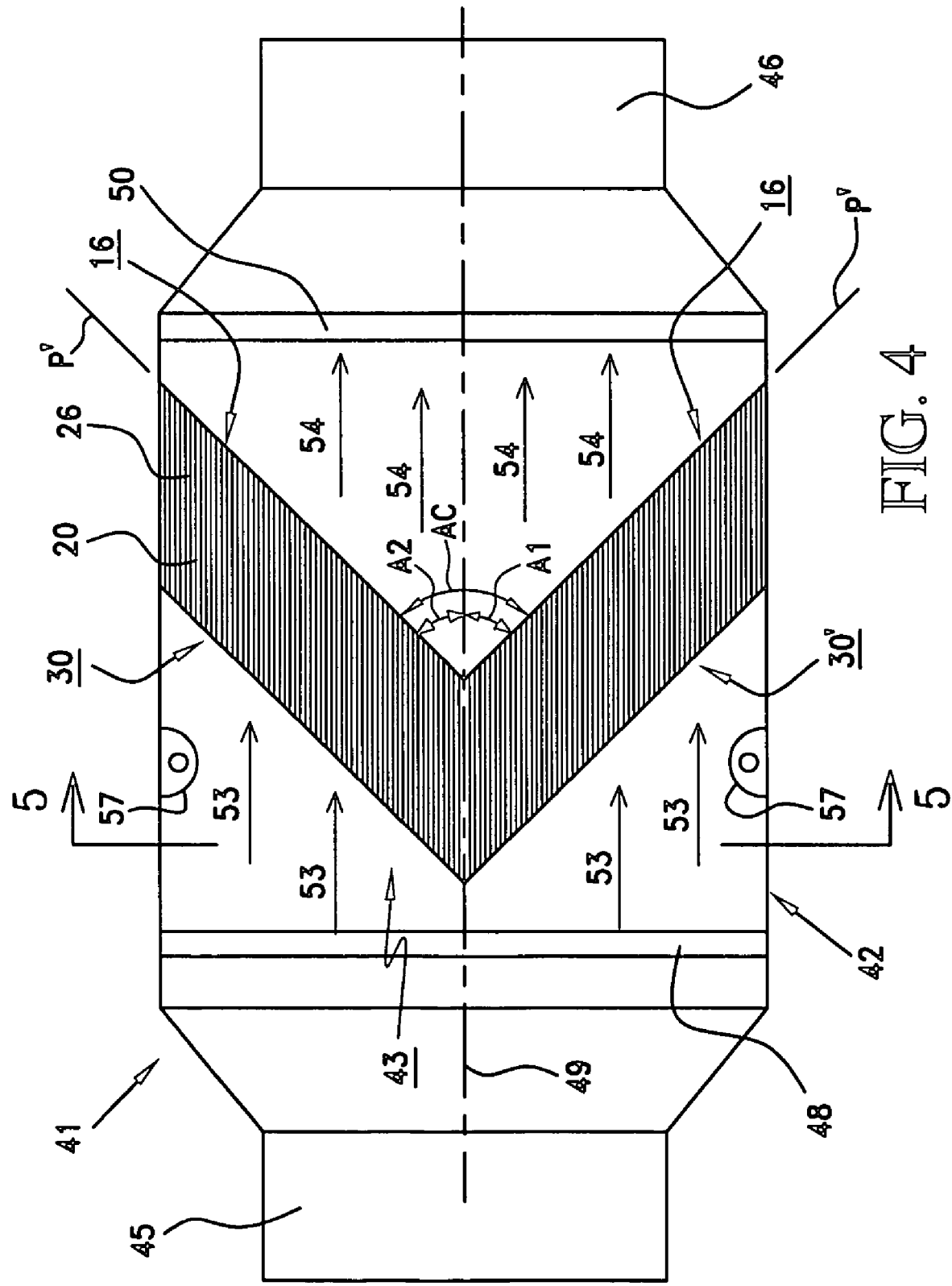
FIG. 4 is an elevational side view of an air filter and purification unit in which are mounted two of the filter members of FIG. 3, and wherein the near sidewall has been removed for clarity.
Figure 6:
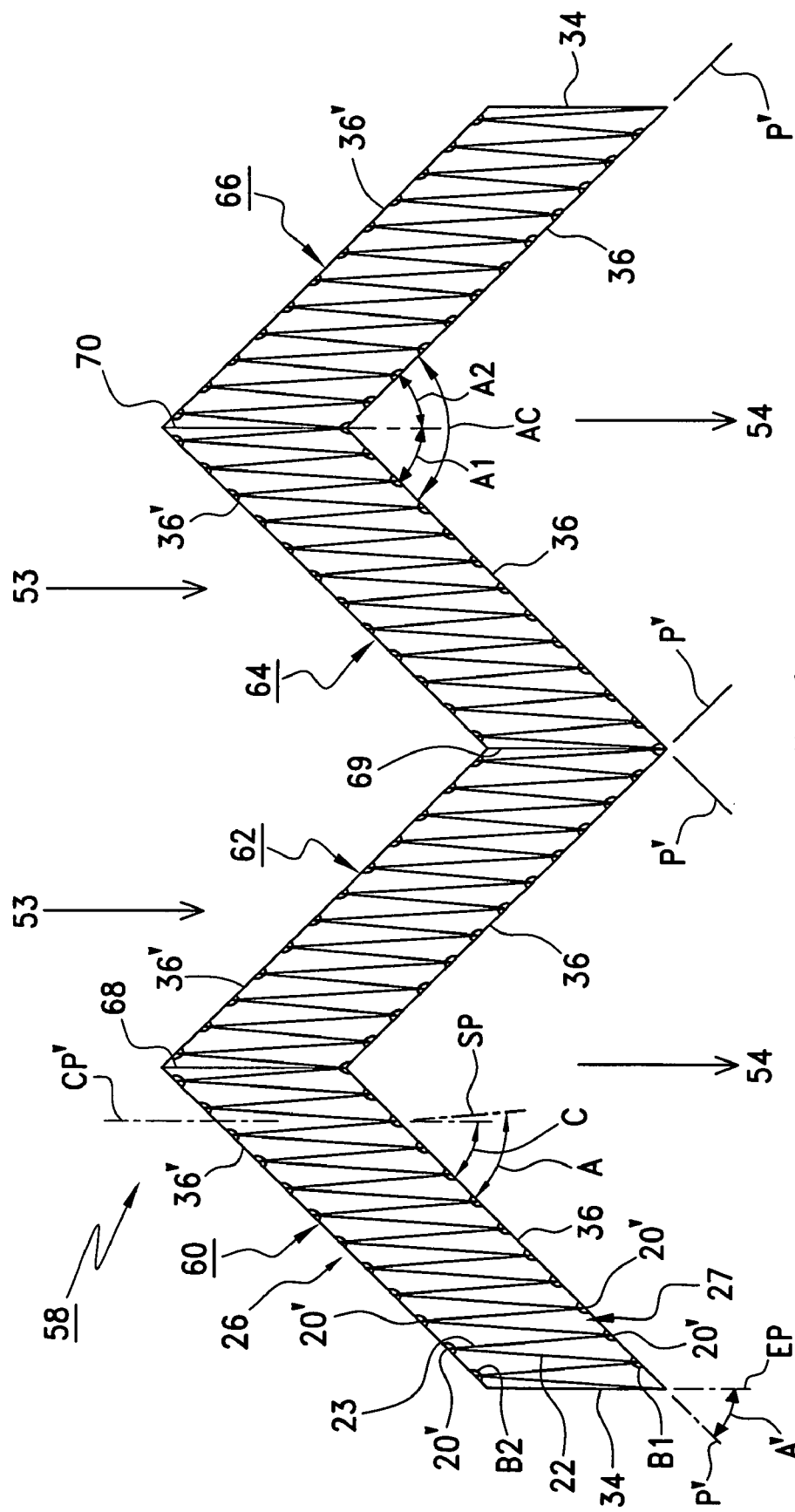

The reference plane P' is shown in FIGS. 2 and 3 as being horizontal for purposes of the explanation herein, but will usually have some other orientation when the filter element is in use, such as shown in FIGS. 4 and 6. The central plane CP' is equidistant from each sidewall of the pleat pocket and, when each pocket has substantially parallel sidewalls, as preferred, the angle A between each sidewall and reference plane P' is substantially equal to the angle C as is shown in FIG. 2. However, if the sidewalls 22 and 23 diverge significantly from fold to pocket opening, angle A may be substantially greater than angle C as shown for the modified filter members illustrated diagrammatically in FIG. 6. The Angle C is substantially less than 90 degrees, i.e., less than 85 degrees, preferably about 15 to about 75 degrees, more preferably about 30 to about 60 degrees, and most preferably about 45 degrees, plus or minus 5 degrees.

Each pleat 20 is secured to and spaced from its adjacent pleat by a bonding and separating medium, such as a hot melt adhesive applied to the filtering media 18 before it is folded. This adhesive is preferably applied in a plurality of rows that form beads of adhesive, such as beads 24 and 25. The media 18 is then folded and bonded so that sidewall 23 is shorter than sidewall 22. This folding and bonding of the filtering media 18 creates a series of entering pockets 26 between opposing parallel sidewalls 23-22 of adjacent pleats 20,20, and a series of exiting pockets 27 between opposite parallel sidewalls 22-23 of the same pleat 20. The resultant angle A, which equals angle C because the sidewalls are parallel, causes the effective height 28 of the sidewalls 22 of the pleats 20, which corresponds substantially to the depths of the pockets 26 and 27, to be greater than the overall depth 29 of the filter element 16.

Referring now to FIG. 3, there is shown a filter member 30, which is also designated as 30' because two of these filter members are also shown in FIG. 4. Members 30 and 30' are identical, each comprising a rectangular frame 32 constructed of a non-porous material and having sidewalls 37 and 38 and canted end walls 34 and 35. The respective ends 39 and 40 of the sidewalls are formed at an angle A' so that the end walls 34 and 35 will also be canted at this angle, which is essentially the same as angle A of the pleated element 16. The resulting structure produces a fluid filter having the maximum effective filtering area within the constraints imposed by the overall dimensions of standard installation spaces.

The pleated filter element 16 is sealed into the frame 32 with a suitable compound to ensure that all contaminated air must pass through the filtering media 18. As may be seen in FIG. 3, a flange 36 along the downstream edges of the frame walls 34, 35, 37 and 38 helps ensure that the pressure of the air or other fluid flowing against and through the filtering media 18 will not dislodge the element 16 from the frame 32.

Figure 5:
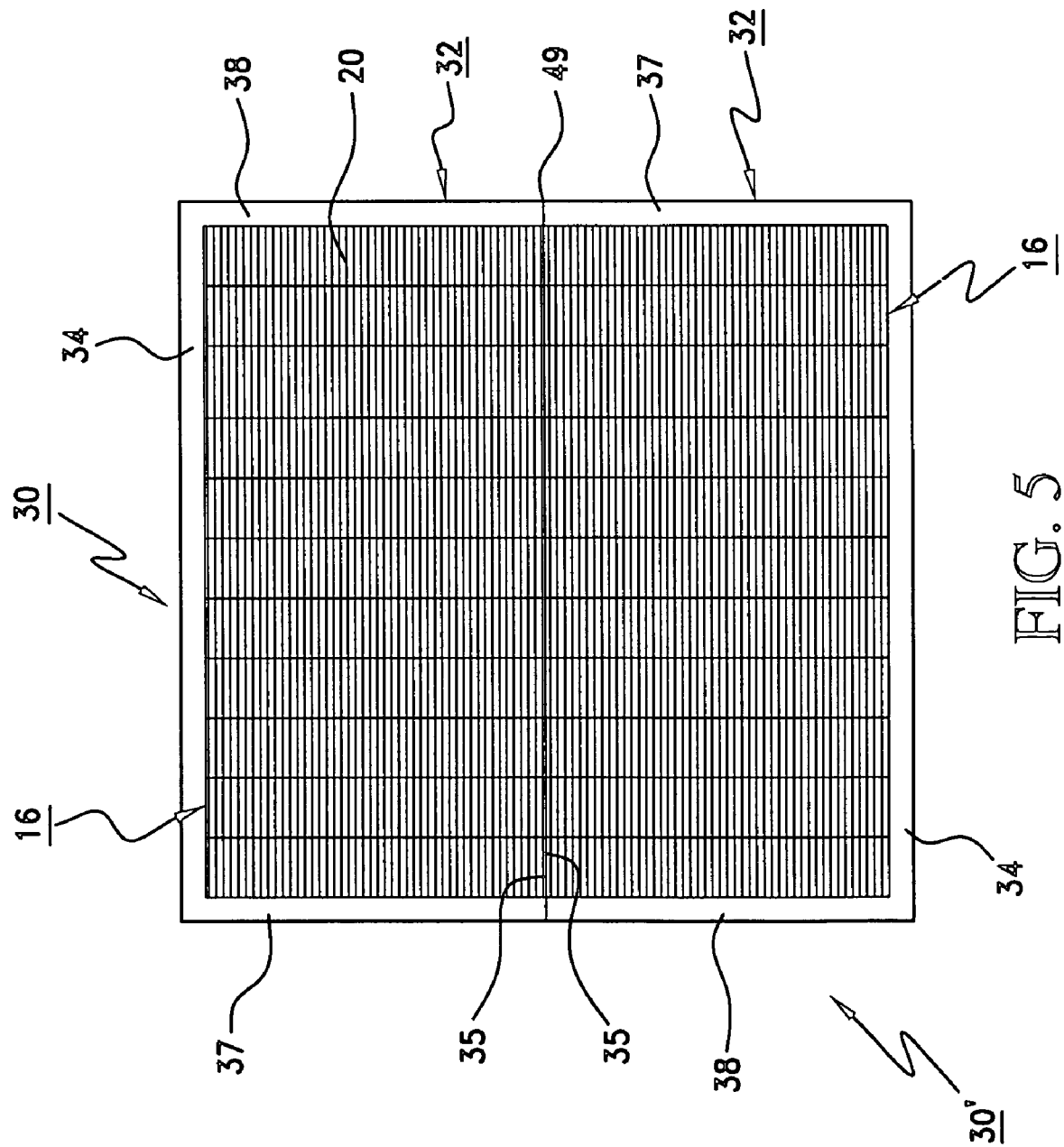
FIG. 5 is sectional view of the air filter and purification unit taken along lines 5-5 of FIG. 4; and, FIG. 6 is a diagrammatic view illustrating other multiple filter configurations and a modification of the filter member of FIG. 3.

The two identical filter members 30 and 30' of FIG. 3 may be oriented to form a composite V-shaped filter 43 and installed in the housing 42 of an air filtering unit 41 as shown in FIGS. 4 and 5. When the filter members 30 and 30' are arranged one adjacent to the other with the canted end wall 35 of member 30 in abutment with the canted end wall 35 of member 30', there is formed a composite filter having a V-shape in which the reference planes P' of the adjacent members form a composite angle AC that is equal to the sum of the respective angles A1 and A2 between the planes P' and a central housing plane 49 along which the respective end walls 35, 35 are in abutment.

Furthermore, in accordance with the resulting geometry, both A1 and A2 are substantially equal to the cant angle A' of the end walls 35, which in turn is substantially equal to the cant angle A of the pleats of the adjacent abutting members 30 and 30'. For example, if angle A is 45 degrees, then angles A', A1 and A2 are about 45 degrees and angle AC is about 90 degrees, which are approximately the angles illustrated in FIGS. 2-4 of the drawings. However, the angle A of the pleats and the angle A' of the frame of member 30 need not be substantially equal to the angle A of the pleats and the angle A' of the frame of member 30', in which case the V-shaped composite filter 43 will not be symmetrical.

The canted end walls 35, 35 of the respective frames of the two abutting members are bonded together along the abutment plane 49 and the opposite canted end walls 34, 34 are mounted on and flush with opposite walls of the housing 42, which preferably has a rectangular transverse cross section. In the resulting orientation of the filter elements 16, 16, the central axes or planes of the entering pockets 26 of the pleats are aligned so as to be substantially parallel to the direction of the incoming air or other fluid flow as represented by the arrows 53, and the central axes or planes of the exiting pockets 27 of the pleats are aligned so as to be substantially parallel to the direction of the outgoing fluid flow as represented by the arrows 54. Also, in this orientation, the adjacent abutting members 30 and 30' form a V-shape having its apex facing toward the direction of the incoming fluid flow.

More specifically, contaminated air, the flow of which is represented by arrows 53, flows into the front face of composite filter 30, 30' and enters the pockets 26 substantially parallel to central plane CP' and to opposing sidewalls 22 and 23 of adjacent pleats, allowing its unrestricted passage into and out of the pockets of the fanfolded filtering media 18. The clean filtered air, the flow of which is represented by arrows 54, leaves the pockets 27 and the rear face of the composite filter 30, 30' substantially parallel to opposite sidewalls 22 and 23 of the same pleat. The installed orientation of each filter element thereby avoids causing either the incoming air or the outgoing air to "bend" in order to pass through the filter media of the filter structure. Therefore, the canted pleats 20 greatly increase the effective surface area of the filtering media while the orientation of the filter members 30, 30' relative to the airflow direction prevent an increase in the "flow resistance", which otherwise could reduce the air pressure and flow rate downstream of these filters.

The filter members 30, 30' may serve as HEPA (High Efficiency Particulate Air) filters when installed according to the invention in a traditional air filtering unit, such as the filtering and purification unit 41 of a central air conditioning system for a whole house, which may for example have a rated capacity of 2000 CFM (cubic feet per minute). A replaceable pre-filter 48 of conventional design may be installed up stream to capture large contaminants and thereby prolong the HEPA filter life. A replaceable carbon filter 50 of conventional design may be installed to remove gases and odors commonly found in residential and commercial establishments. Ultraviolet (UV) light sources 57, 57 may be used to kill mold.

The unit 41 can be installed into the return ducting of any existing system with the aid of inlet and outlet duct adapters 45 and 46. Each of the filters 30, 30', 48 and 50 may be replaced through a corresponding access door (not shown) in the side of housing 20, although filters 30 and 30' would usually be removed and replace together as a composite filter component since they are preferably bonded together as an integral structure by an adhesive or the like.

Referring now to FIG. 6, a composite filter structure 58 comprises a plurality of canted pleat filter members 60, 62, 64 and 66. These multiple filter members are arranged in alternating V-shapes wherein identical canted end walls of adjacent members are placed in abutment and sealed (bonded) to each other along parallel planes 68, 69 and 70 to form one large composite filter structure. In this structure, each of the sub-combinations 60,62 and 64,66 are similar to the composite filter 43 in FIG. 4 in that the adjacent abutting members 60 and 62 and the adjacent abutting members 64 and 66 form V-shapes having their apexes facing toward the direction of the incoming fluid flow 53. The sub-combination 62,64 is also similar to the composite filter 43, except that the apex of its V-shape is arranged facing in the opposite direction, i.e., in the direction of the outgoing fluid flow 54.

Thus, the reference planes P' of each set of adjacent members form a composite angle AC that is equal to the sum of the respective angles A1 and A2 between the planes P' and the abutment planes 68, 69 and 70. In accordance with the resulting geometry, both A1 and A2 are substantially equal to the cant angle A' of the end walls 34 and 35, which in turn is substantially equal to the cant angle C of the central plane CP' of the pleats of the adjacent abutting members 60-62, 62-64 and 64-66. However, the angle C of the pleats and the angle A' of the frame in one filter member need not be substantially equal to the angle C of the pleats and the angle A' of the frame in the adjacent filter member, in which case the V-shapes of the composite filter 58 will not be symmetrical.

Although filter members 60, 62, 64 and 66 may be identical in structure to members 30 and 30' of FIG. 3, FIG. 6 also illustrates that the angle A, between P' and SP, may be substantially greater than the angle C if the sidewalls 22 and 23 diverge significantly from the fold to the pocket openings. Thus, in FIG. 6, the sidewalls of the pleats 20'0 have such a divergence because adjacent pleats are not adhered together by adhesive beads like beads 24 and 25 in FIG. 2. Instead, the fold of each pleat is adhered to an abutting side flange of a frame by a linear bead of adhesive that is as long as the flange is wide, adhesive beads B1 adhering folds to flange 36 and adhesive beads B2 adhering folds to a second flange 36'. If the angles C and A' are substantially equal, as is preferred, the plane EP of the end wall 34 of the frame is parallel to the central plane CP' as also shown in FIG. 6. Although each fold is shown adhered to a frame member by way of example, only a portion of the folds may be adhered to a frame member, such as where a frame member is provided only on one side of the filter element as is shown in FIG. 3.

Each filter member of the composite filter 58 is arranged so that the central axes or planes of the entering pleat pockets 26 are aligned so as to be substantially parallel to the direction of the incoming airflow 53, and so that the central axes or planes of the exiting pleat pockets 27 are aligned so as to be substantially parallel to the direction of the outgoing airflow 54. Therefore, neither of these airflows is required to bend in order to enter or leave the filter pockets. In addition, the central axes or planes of the entering pleat pockets 26 and the central axes or planes of the exiting pleat pockets 27 are substantially parallel to the abutment planes 68, 69 and 70 between adjacent filter members.

It follows from the foregoing description that, when contaminated air enters the filter member 30 or a composite filter comprising two or more of these filter members, such as composite filter 43 and composite filter 58, the air flow can permeate through the filter media 18 with the least hindrance and thereby attain the greatest airflow possible for any given media and filter parameters. These filters of the invention can have a larger media surface area than is possible with conventional filters because their canted pleat structure reduces pressure drop and increases fluid flow when aligned with the direction of that flow as described above.

What is claimed is:

1. A composite filter assembly comprising a plurality of filter members each supporting a fanfold filter element comprising a plurality of canted pleats of a fluid filtering media, each pleat having opposite sidewalls on opposite sides of a fold forming a pocket of the pleat, and said plurality of pleats having alternating folds forming adjacent pockets with openings facing in opposite directions, said opposite sidewalls having different heights so that a central plane equidistant therebetween is canted at an acute angle of less than 85 degrees relative to a plane tangent to an outer surface of the folds of said pleats on one side of said filter element; and securing means for securing said canted pleats together to maintain said cant angle; the cant angle of said canted filter element being sufficient to substantially increase a surface area of the filtering media as compared to a surface area of the same filtering media in a non-canted filter element having pleats formed with opposite sidewalls equidistant from a central plane that is at an angle of 90 degrees relative to said tangent plane, where the overall depths of said canted and non-canted filtering elements are substantially the same, and wherein said filter members are arranged one adjacent to another with a canted end of said one filter member in abutment with a canted end of said another filter member to form a V-formation in which the tangent planes of said adjacent members intersect at a composite angle that is substantially equal to a sum of the respective cant angles of said adjacent members.

2. A fanfold filter element according to claim 1, wherein said cant angle is in the range of about 15 to about 75 degrees.

3. A fanfold filter element according to claim 1, wherein said cant angle in the range of about 40 to about 50 degrees.

4. A fanfold filter element according to claim 1, wherein said cant angle is sufficient to increase the surface area of the filter media of said canted filter element by about 40% to about 50% relative to the filter media of said non-canted filter element.

5. A filter member comprising a fanfold filter element according to claim 1, and frame means for supporting said filter element so that it may be mounted with the central plane of said canted pleats presented substantially parallel to a direction of a fluid flow to provide a lower pressure drop than could be achieved by a non-parallel presentation of said canted pleats to said direction of fluid flow.

6. A filter assembly comprising a fanfold filter element according to claim 1, and mounting means for mounting said filter element so that the central plane of said canted pleats is presented substantially parallel to a direction of a fluid flow to provide a lower pressure drop than could be achieved by a non-parallel presentation of said canted pleats to said direction of fluid flow.

7. A filter assembly according to claim 1 wherein an apex of said V-formation faces in a direction from which a fluid is to flow into said adjacent filter members.

8. A filter element according to claim 1, wherein said securing means comprises an adhesive securing at least a portion of a sidewall of each pleat to at least a portion of an opposing sidewall of an adjacent pleat.

9. A filter element according to claim 1, wherein said securing means comprises an adhesive securing at least a portion of the pleat folds to a frame means for mounting said filter element.

10. A composite filter assembly comprising a plurality of filter members each supporting a fanfold filter element comprising a plurality of canted pleats of a fluid filtering media, each pleat having opposite sidewalls on opposite sides of a fold forming a pocket of the pleat, and said plurality of pleats having alternating folds forming adjacent pockets with openings facing in opposite directions, said opposite sidewalls being substantially parallel and having different heights so that they are canted at an acute angle of less than 85 degrees relative to a plane tangent to an outer surface of the folds of said pleats on one side of said filter element; and securing means for securing said canted pleats together to maintain said cant angle, the cant angle of said canted filter element being sufficient to substantially increase a surface area of the filtering media as compared to a surface area of the same filtering media in a non-canted filter element having pleats formed with opposite sidewalls at an angle of 90 degrees relative to said tangent plane, where the overall depths of said canted and non-canted filtering elements are substantially the same, and wherein said filter members are arranged one adjacent to another with a canted end of said one filter member in abutment with a canted end of said another filter member to form a V-formation in which the tangent planes of said adjacent members intersect at a composite angle that is substantially equal to a sum of the respective cant angles of said adjacent members.

11. A fanfold filter element according to claim 10, wherein said cant angle is in the range of about 15 to about 75 degrees.

12. A fanfold filter element according to claim 10, wherein said cant angle in the range of about 40 to about 50 degrees.

13. A fanfold filter element according to claim 10, wherein said cant angle is sufficient to increase the surface area of the filter media of said canted filter element by about 40% to about 50% relative to the filter media of said non-canted filter element.

14. A filter member comprising a fanfold filter element according to claim 10, and frame means for supporting said filtering element so that it may be mounted with the sidewalls of said canted pleats presented substantially parallel to a direction of a fluid flow to provide a lower pressure drop than could be achieved by a non-parallel presentation of said canted pleats to said direction of fluid flow.

15. A filter assembly comprising a fanfold filter element according to claim 10, and mounting means for mounting said filter element so that the sidewalls of said canted pleats are presented substantially parallel to a direction of a fluid flow to provide a lower pressure drop than could be achieved by a non-parallel presentation of said canted pleats to said direction of fluid flow.

16. A filter assembly according to claim 10, wherein an apex of said V-formation faces in a direction from which a fluid is to flow into said adjacent filter members.

17. A filter element according to claim 10, wherein said securing means comprises an adhesive securing at least a portion of a sidewall of each pleat to at least a portion of an opposing sidewall of an adjacent pleat.

18. A filter element according to claim 10, wherein said securing means comprises an adhesive securing at least a portion of the pleat folds to a frame means for mounting said filter element.

19. A fanfold filter element comprising a plurality of canted pleats of a fluid filtering media, each pleat having opposite sidewalls on opposite sides of a fold forming a pocket of the pleat, and said plurality of pleats having alternating folds forming adjacent pockets with openings facing in opposite directions, said opposite sidewalls having different heights so that a central plane equidistant therebetween is canted at an acute angle of less than 85 degrees relative to a plane tangent to an outer surface of the folds of said pleats on one side of said filter element; securing means for securing said canted pleats together to maintain said cant angle; the cant angle of said canted filter element being sufficient to substantially increase a surface area of the filtering media as compared to a surface area of the same filtering media in a non-canted filter element having pleats formed with opposite sidewalls equidistant from a central plane that is at an angle of 90 degrees relative to said tangent plane, where the overall depths of said canted and non-canted filtering elements are substantially the same; and frame means for supporting said filter element so that it may be mounted with the central plane of said canted pleats presented substantially parallel to a direction of a fluid flow to provide a lower pressure drop than could be achieved by a non-parallel presentation of said canted pleats to said direction of fluid flow.

20. A fanfold filter element comprising a plurality of canted pleats of a fluid filtering media, each pleat having opposite sidewalls on opposite sides of a fold forming a pocket of the pleat, and said plurality of pleats having alternating folds forming adjacent pockets with openings facing in opposite directions, said opposite sidewalls having different heights so that a central plane equidistant therebetween is canted at an acute angle of less than 85 degrees relative to a plane tangent to an outer surface of the folds of said pleats on one side of said filter element; securing means for securing said canted pleats together to maintain said cant angle; the cant angle of said canted filter element being sufficient to substantially increase a surface area of the filtering media as compared to a surface area of the same filtering media in a non-canted filter element having pleats formed with opposite sidewalls equidistant from a central plane that is at an angle of 90 degrees relative to said tangent plane, where the overall depths of said canted and non-canted filtering elements are substantially the same; and mounting means for mounting said filter element so that the central plane of said canted pleats is presented substantially parallel to a direction of a fluid flow to provide a lower pressure drop than could be achieved by a non-parallel presentation of said canted pleats to said direction of fluid flow.

21. A fanfold filter element comprising a plurality of canted pleats of a fluid filtering media, each pleat having opposite sidewalls on opposite sides of a fold forming a pocket of the pleat, and said plurality of pleats having alternating folds forming adjacent pockets with openings facing in opposite directions, said opposite sidewalls being substantially parallel and having different heights so that they are canted at an acute angle of less than 85 degrees relative to a plane tangent to an outer surface of the folds of said pleats on one side of said filter element; securing means for securing said canted pleats together to maintain said cant angle, the cant angle of said canted filter element being sufficient to substantially increase a surface area of the filtering media as compared to a surface area of the same filtering media in a non-canted filter element having pleats formed with opposite sidewalls at an angle of 90 degrees relative to said tangent plane, where the overall depths of said canted and non-canted filtering elements are substantially the same; and frame means for supporting said filtering element so that it may be mounted with the sidewalls of said canted pleats presented substantially parallel to a direction of a fluid flow to provide a lower pressure drop than could be achieved by a non-parallel presentation of said canted pleats to said direction of fluid flow.

22. A fanfold filter element comprising a plurality of canted pleats of a fluid filtering media, each pleat having opposite sidewalls on opposite sides of a fold forming a pocket of the pleat, and said plurality of pleats having alternating folds forming adjacent pockets with openings facing in opposite directions, said opposite sidewalls being substantially parallel and having different heights so that they are canted at an acute angle of less than 85 degrees relative to a plane tangent to an outer surface of the folds of said pleats on one side of said filter element; securing means for securing said canted pleats together to maintain said cant angle, the cant angle of said canted filter element being sufficient to substantially increase a surface area of the filtering media as compared to a surface area of the same filtering media in a non-canted filter element having pleats formed with opposite sidewalls at an angle of 90 degrees relative to said tangent plane, where the overall depths of said canted and non-canted filtering elements are substantially the same; and mounting means for mounting said filter element so that the sidewalls of said canted pleats are presented substantially parallel to a direction of a fluid flow to provide a lower pressure drop than could be achieved by a non-parallel presentation of said canted pleats to said direction of fluid flow.

\* \* \* \* \*